Nov. 9, 1926.
J. G. SISSON
COMBINED DEPTH GAUGE AND PROTRACTOR
Filed March 9, 1925
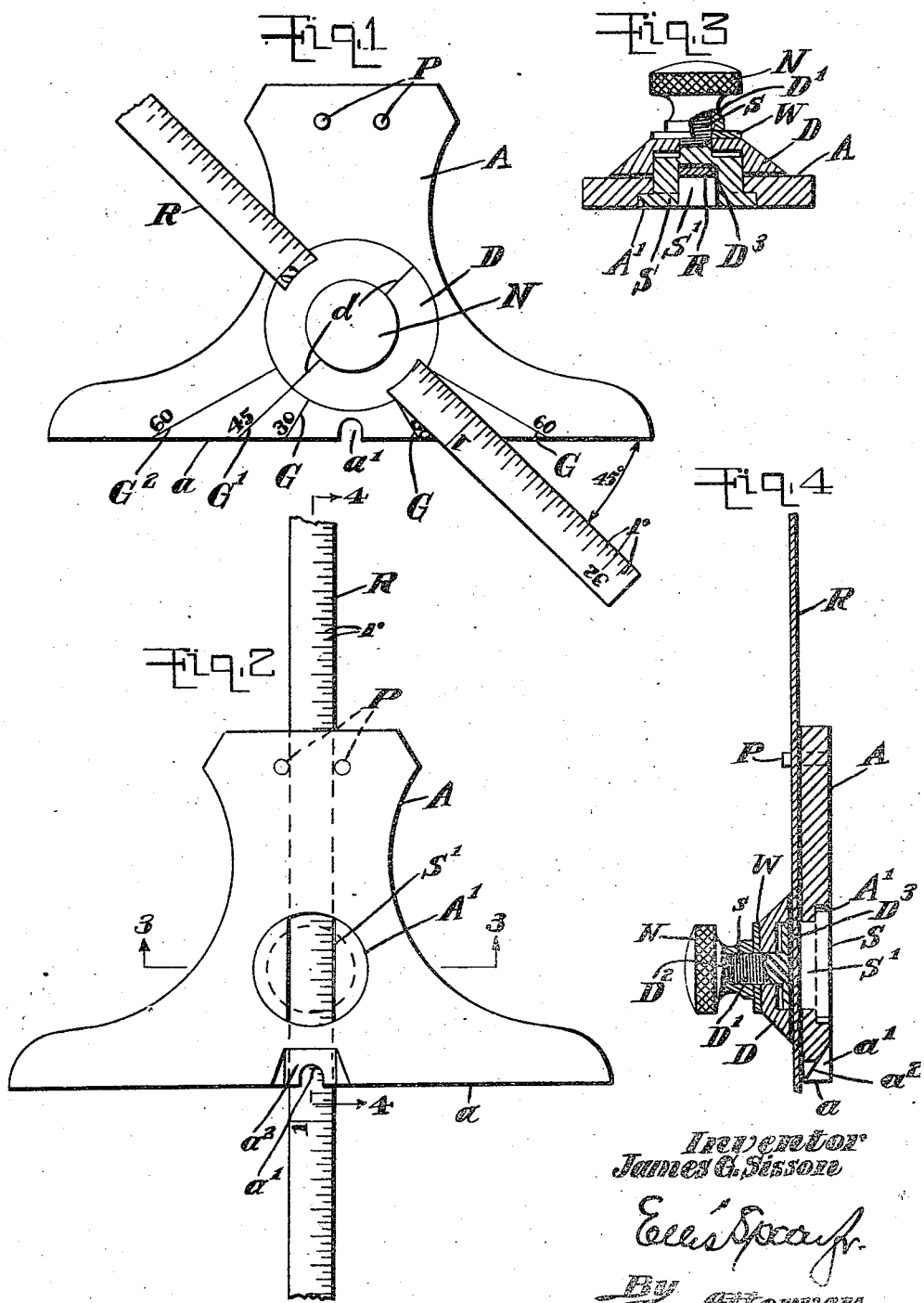
Inventor
James G. Sisson Patented Nov. 9, 1926.

1,606,192

UNITED STATES PATENT OFFICE.

JAMES G. SISSON, OF ATHOL, MASSACHUSETTS, ASSIGNOR TO THE L. S. STARRETT COMPANY, OF ATHOL, MASSACHUSETTS, A CORPORATION OF MASSACHUSETTS.

COMBINED DEPTH GAUGE AND PROTRACTOR.

Application filed March 9, 1925. Serial No. 14,074.

My present invention has to do with certain improvements in protractors and particularly in a combined depth gauge and protractor.

This type of combination tool has been found to be very useful among skilled workmen and the type is so far fixed and accepted that I have applied myself to the task of increasing its usefulness, perfecting its accuracy and in providing novel construction.

As an embodiment of such construction I have shown in the accompanying drawings a tool of general standard and accepted type but of increased versatility in meeting angular requirements, of greater certainty in perpendicular positioning, and in more sensitiveness and greater positiveness in its locking head. Throughout the specification and drawings like reference characters are employed in the designation of corresponding parts, and in the drawings:

Fig. 1 is a plan or upper face view of my protractor.

Fig. 2 an opposite face view of the same set as a depth gauge.

Fig. 3 a section on the line 3—3, of Fig. 2 and

Fig. 4 a section at right angles thereto.

My base A is generally of standard form but having its edge $a$ carefully ground. This edge is notched as at $a^1$ and on the rear face (see Fig. 2) there is a beveled face $a^2$ running to the opposite side on which the rule R bears so as to get a better setting of its graduations $r$.

In the perpendicular to the base edge $a$ at the center of its notch $a^1$ is centered a shouldered bearing $A^1$ and symmetrically disposed on each side of said perpendicular are guide pins P spaced apart the width of the rule R to hold the rule in the perpendicular when the tool is used as a depth gauge.

In the bearing $A^1$ I mount the dial head which carries the rule R. This head comprises a flat headed bridge stud S fitting within the shouldered bearing $A^1$. The stud S is cut out in a deep channel $S^1$ of greater width than the rule R so the rule is perfectly free to slide against what I have called the top surface of the base.

This freedom of bearing of the smooth polished rule R on the smooth polished surface of the head A not only gives great freedom in movement in adjustment, but makes possible a delicacy and yet a firmness in clamping which represents a distinct refinement in the use of instruments of this type.

The bridge stud S has a central stem $s$ threaded to receive the nut N which bears on the washer W which in turn bears on the flat top of the dial D. The dial D is a low truncated cone having its lateral face graduated at two or more points as at $d$. It has a central bore $D^1$ to receive freely the threaded stem $s$ and is counterbored at $D^2$ to clear the stud S. The dial D is further provided with a shallow way $D^3$ of slightly less depth than the thickness of the rule R. This difference (which may be as little as two or three one thousandths) makes it possible with a low pitched thread on the stem $s$ to lock and release the dial D and the rule R without disturbing the adjustment.

The so-called top surface of the head A is provided with conventional graduations G, $G^1$, $G^2$, etched radially with reference to the central axis of the bearing $A^1$ and overlapped by the dial D so that its graduations $d$ may be brought into registry with any of the same to position the rule R at the desired angle, as for example, 30°, 45° or 60°. For the 90° position of the rule the fixed pins P are employed, as in the use of a depth gauge they relieve the dial of its registering function and permit the workman to concentrate on the graduated reading on the rule R through the notch $a^1$ with reference to the knife edge formed by the bevel $a^2$ in its intersection with the edge $a$.

While my tool above described is of standard type, it will be seen that it represents an important advance in the art and one that gives it in the hands of the skilled mechanic a greater reliability in old uses as well as new fields of potential use. While shown and described as such a standard type, it will be understood that the tool may be otherwise designed and may be modified, as for example, by increasing the number of graduations on the dial or increasing or reducing the angle marks on the face of the base. The adjustments are readily and quickly made by a slight loosening of the nut and as there are no channels the smooth rule turns readily on the smooth face of the base. Where the rule has been positioned between the pins P, it may be readily disengaged by releasing the clamp slightly and by sliding the rule until it clears the pins after which it may be turned as above described.

In claiming my invention therefore, while distinctly recognizing the prior status of this type of tool in the trade, I do not wish to be limited to details of exact structure in the illustration of my tool as I have commercially perfected it.

What I therefore claim and desire to secure by Letters Patent is:

1. In a tool of the class described, a base having a straight edge, a dial head including a bridge stud mounted on said base and having a channel transversely therethrough, a rule disposed in said channel, means cooperating with said stud for clamping the rule in said channel, and a pair of spaced pins on said base and disposed to position the rule in perpendicular relation to the straight edge of the base.

2. In a tool of the class described, a base having a straight edge and having a shouldered bearing, a dial head including a bridge stud fitted in said bearing and having a channel transversely therethrough, a rule disposed in said channel, a nut threaded on said stud for clamping the rule in said channel, and a pair of spaced pins on said base and disposed to position the rule in perpendicular relation to the straight edge of the base.

In testimony whereof I affix my signature.

JAMES G. SISSON.